United States Patent
Claes

(10) Patent No.: US 10,425,416 B2
(45) Date of Patent: Sep. 24, 2019

(54) METHOD OF UNBLOCKING EXTERNAL COMPUTER SYSTEMS IN A COMPUTER NETWORK INFRASTRUCTURE, DISTRIBUTED COMPUTER NETWORK HAVING SUCH A COMPUTER NETWORK INFRASTRUCTURE AS WELL AS COMPUTER PROGRAM PRODUCT

(71) Applicant: Fujitsu Technology Solutions Intellectual Property GmbH, München (DE)

(72) Inventor: Heinz-Josef Claes, Ronneburg (DE)

(73) Assignee: Fujitsu Technology Solutions Intellectual Property GmbH, München (DE)

( * ) Notice: Subject to any disclaimer, the term of this patent is extended or adjusted under 35 U.S.C. 154(b) by 100 days.

(21) Appl. No.: 15/325,778

(22) PCT Filed: Jul. 14, 2015

(86) PCT No.: PCT/EP2015/066072
§ 371 (c)(1),
(2) Date: Jan. 12, 2017

(87) PCT Pub. No.: WO2016/008889
PCT Pub. Date: Jan. 21, 2016

(65) Prior Publication Data
US 2017/0163646 A1    Jun. 8, 2017

(30) Foreign Application Priority Data
Jul. 15, 2014 (DE) .................. 10 2014 109 906

(51) Int. Cl.
*H04L 29/06* (2006.01)
*G06F 21/12* (2013.01)
*H04L 9/32* (2006.01)

(52) U.S. Cl.
CPC ............ *H04L 63/10* (2013.01); *G06F 21/121* (2013.01); *H04L 9/32* (2013.01);
(Continued)

(58) Field of Classification Search
CPC ..... H04L 63/10; H04L 9/32; H04L 29/06551; H04L 63/1466; H04L 63/166; H04L 63/302; G06F 21/121
See application file for complete search history.

(56) References Cited

U.S. PATENT DOCUMENTS

| 2006/0031506 A1* | 2/2006 | Redgate ................. H04L 29/06 709/226 |
| 2009/0106834 A1* | 4/2009 | Borzycki ............. H04L 63/166 726/21 |

(Continued)

FOREIGN PATENT DOCUMENTS

| EP | 2 448 171 A1 | 5/2012 |
| EP | 2 772 856 A1 | 9/2014 |

(Continued)

OTHER PUBLICATIONS

Mark L. Green et al., "Grid-Enabled Virtual Organization Based Dynamic Firewall," Proceedings of the Fifth IEEE/ACM International Workshop on Grid Computing (GRID'04), Nov. 2004.

(Continued)

*Primary Examiner* — Jason K Gee
*Assistant Examiner* — Ka Shan Choy
(74) *Attorney, Agent, or Firm* — DLA Piper LLP (US)

(57) ABSTRACT

A method of unblocking external computer systems includes transmitting an authentication packet from an external computer system, configured outside the computer network infrastructure, to a broker computer system within the computer network infrastructure, wherein the authentication packet contains signed information for authentication of the external computer system, automatically transmitting the authentication packet from the broker computer system to at least one processing computer system within the computer network infrastructure, wherein the processing computer system keeps predetermined network ports at least tempo- (Continued)

rarily closed wherein, however, the processing computer system is capable of accessing the broker computer system to fetch the authentication packet from the broker computer system, unblocking at least one selective network port by the processing computer system for communication with the external computer system, and establishing a connection to the selectively unblocked network port of the processing computer system by the external computer system.

16 Claims, 4 Drawing Sheets

(52) U.S. Cl.
CPC .... *H04L 29/06551* (2013.01); *H04L 63/0281* (2013.01); *H04L 63/08* (2013.01); *H04L 63/1466* (2013.01); *H04L 63/166* (2013.01); *H04L 63/302* (2013.01)

(56) References Cited

U.S. PATENT DOCUMENTS

| | | | |
|---|---|---|---|
| 2010/0211995 A1 | 8/2010 | Yoshida | |
| 2012/0096172 A1* | 4/2012 | Tyukasz | H04L 63/029 709/227 |
| 2013/0298218 A1 | 11/2013 | Rash | |
| 2014/0245310 A1 | 8/2014 | Claes | |
| 2014/0310418 A1* | 10/2014 | Sorenson, III | H04L 67/1002 709/226 |

FOREIGN PATENT DOCUMENTS

| | | | | |
|---|---|---|---|---|
| JP | 2010-192947 | | 9/2010 | |
| WO | WO 9826554 A1 * | | 6/1998 | ....... H04L 29/12216 |

OTHER PUBLICATIONS

Barry Rhodes et al., "On Securing the Public Health Information Network Messaging System," $4^{th}$ Annual PKI R&D Workshop—Proceedings, Aug. 2005.

R. Niederberger et al., "Firewall Virtualization for Grid Applications—Work Group," Open Grid Forum, Mar. 2009.

Fakariah Hani Mohd Ali et al., "Simple Port Knocking Method Against TCP Replay Attack and Port Scanning," Cyber Security, Cyber Warfare and Digital Forensic (CyberSec), 2012 International Conference.

Japanese Office Action dated Mar. 6, 2018, of corresponding Japanese Application No. 2017-502144, along with an English translation.

* cited by examiner

METHOD OF UNBLOCKING EXTERNAL COMPUTER SYSTEMS IN A COMPUTER NETWORK INFRASTRUCTURE, DISTRIBUTED COMPUTER NETWORK HAVING SUCH A COMPUTER NETWORK INFRASTRUCTURE AS WELL AS COMPUTER PROGRAM PRODUCT

TECHNICAL FIELD

This disclosure relates to a method of unblocking external computer systems for communication with secured processing computer systems in a computer network infrastructure, a distributed computer network with a computer network infrastructure and at least one external computer system, as well as to a computer program product that performs a corresponding method.

BACKGROUND

Distributed computer systems describe a multitude of computer systems able to communicate with each other via data connections on computer network infrastructures in an organized manner. Distributed computer systems are used in computer network infrastructures, for example, comprising server-client topologies, wherein partly confidential data, customer data or user data, for example, are exchanged between a client and a server and access to data by third parties is to be suppressed.

In secured computer network infrastructures, processing computer systems on which (confidential) data is processed, are specifically secured. Predetermined network ports of the processing computer systems can be initially closed, for example, so that access or connection establishment to a respective processing computer system is not possible.

Conventional solutions provide sending predetermined knocking signals via network to a processing computer system with closed network ports (so-called port knocking), wherein a predetermined data sequence addresses predetermined network ports of the processing computer system. This data sequence is compared to a predetermined sequence in the processing computer system, wherein the processing computer system opens or closes one or more network ports to allow external connection establishment via network, if the comparison was successful.

One risk in those measures is that a processing computer system is opened for attackers (hackers) or non-authorized computer systems that manipulate a respective port-knocking process. This way, a (manipulative) access of third parties to possibly confidential data is possible in the processing computer system by the opened network ports. Furthermore, a program running on one or multiple network ports of the processing computer system is required for addressability of services in the opened processing computer system. This running program constitutes a potential security gap for external attacks (e.g., via buffer overflow or so-called denial-of-service attacks, DOS) via network.

An explicit authentication of an external computer system directly on a processing computer system within the computer network infrastructure for access is of no relevance here because a processing computer system (as explained above) does initially not allow external connection establishment.

In contrast, addressing an external computer system that requires access to a processing computer system is often difficult or even impossible because the external computer system is secured per se and possibly can not be addressed for connection establishment.

Moreover, access to processing computer systems within a computer network infrastructure is, in most cases, effected via internet or a separate intranet (to unblock applications, for example), wherein such accesses are characterized by the fact that the external computer systems accessing the computer network infrastructure (the computing center, for example) arrive via a private access using no (unambiguous) public IP-address. Examples of this include cascaded connections via a proxy or by so-called NAT/PAT masking methods (NAT=Network address translation, PAT=Port Address Translation).

As a result, basically no connection can be initiated by a processing computer system to the respective external computer system within the computer network infrastructure due to the simple fact that the processing computer system does not know the exact IP-address of the external computer system due to the masking of the IP-address. Furthermore, the IP-address normally is private and can not be used directly in routing. Moreover, it is usually secured behind a firewall during communication.

It could therefore be helpful to provide a secured unblocking of external computer systems for communication with secured processing computer systems within a computer network infrastructure and nevertheless improve protection against attacks on respective computer systems in the computer network infrastructure at the same time.

SUMMARY

I provide a method of unblocking external computer systems for communication with secured processing computer systems in a computer network infrastructure, including transmitting an authentication packet from an external computer system, which is configured outside the computer network infrastructure, to a broker computer system within the computer network infrastructure, wherein the authentication packet contains signed information for authentication of the external computer system, automatically transmitting the authentication packet from the broker computer system to at least one processing computer system within the computer network infrastructure, wherein the processing computer system keeps predetermined network ports at least temporarily closed so that access to the processing computer system via network by the network ports is prevented, wherein, however, the processing computer system is capable of accessing the broker computer system to fetch the authentication packet from the broker computer system, unblocking at least one selective network port by the processing computer system for communication with the external computer system, and establishing a connection to the selectively unblocked network port of the processing computer system by the external computer system.

I also provide a distributed computer network including a computer network infrastructure including at least a broker computer system and a processing computer system, and at least one external computer system located outside the computer network infrastructure, wherein the external computer system is configured to transmit an authentication packet to the broker computer system for authentication for communication with the processing computer system, the broker computer system is configured to automatically transmit the authentication packet to the processing computer system, the processing computer system includes an access control unit configured to keep predetermined network ports at least temporarily closed so that access to the processing computer system via a network by these network ports is prevented, but access of the processing computer system to the broker computer system is permitted to fetch the authentication packet from the broker computer system, and the access control unit is further configured to unblock at least one selective network port for communication with the external computer system after a successful authentication of the external computer system at the processing computer system or at a backend processing computer system connected downstream the processing computer system.

I further provide a computer program product configured to be executed on one or multiple computer systems and which, when executed, performs the method of unblocking external computer systems for communication with secured processing computer systems in a computer network infrastructure, including transmitting an authentication packet from an external computer system, which is configured outside the computer network infrastructure, to a broker computer system within the computer network infrastructure, wherein the authentication packet contains signed information for authentication of the external computer system, automatically transmitting the authentication packet from the broker computer system to at least one processing computer system within the computer network infrastructure, wherein the processing computer system keeps predetermined network ports at least temporarily closed so that access to the processing computer system via network by the network ports is prevented, wherein, however, the processing computer system is capable of accessing the broker computer system to fetch the authentication packet from the broker computer system, unblocking at least one selective network port by the processing computer system for communication with the external computer system, and establishing a connection to the selectively unblocked network port of the processing computer system by the external computer system.

LIST OF REFERENCE NUMERALS

Figure 1:
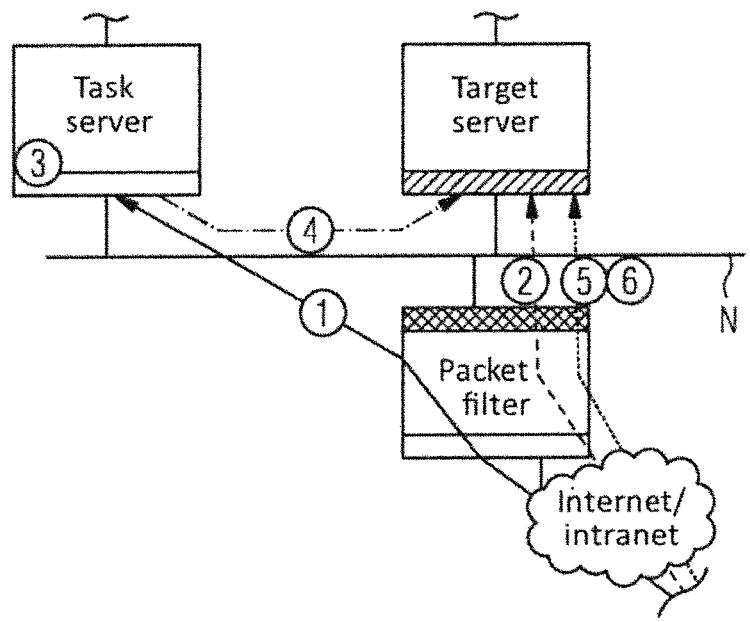
FIG. 1 is a schematic illustration of at least a part of a computer network infrastructure according to a first configuration to unblock an external computer system.

Task server broker computer system
Task server1, 2 broker computer system
Target server processing computer system
target server1,2 (backend) processing computer system
Load balancer1 broker computer system
Load balancer2 processing load balancer
N, N1, N2, N3, N4 network
FW packet filter
1 to 7 method steps

DETAILED DESCRIPTION

In the method, the following steps are provided to unblock external computer systems for communication with secured processing computer systems in a computer network infrastructure.

First, an authentication packet is transmitted from an external computer system, which is configured outside the computer network infrastructure, to a broker computer system within the computer network infrastructure. The authentication packet contains signed information for the authentication of the external computer system.

The authentication packet is automatically transmitted from the broker computer system to at least one processing computer system within the computer network infrastructure. The processing computer system keeps predetermined network ports at least temporarily closed so that access to the processing computer system via network by these network ports is prevented. However, the processing computer system is capable of accessing the broker computer system to fetch the authentication packet from the broker computer system. This process can be effected via a common access network between the broker computer system and the processing computer system or via a specific connection network between the broker computer system and the processing computer system which is provided to that end.

Furthermore, unblocking of at least one selective network port for communication with the external computer system is effected by the processing computer system and a subsequent connection establishment to the selectively unblocked network port of the processing computer system is effected by the external computer system.

In the explained method, all predetermined network ports of the processing computer system are initially closed. The processing computer system therefore acts as an encapsulated (specifically secured) system. Access to the processing computer system via network is not possible or very complicated at least under certain operating conditions (advantageously permanently while performing the method explained herein without unblocking in a targeted manner).

The term "predetermined network ports" means that all or only selected security-critical network ports, e.g., the network ports used for the method, are closed permanently (according to the explained method, the ports are never unblocked) or temporarily (according to the explained method, the ports can selectively be unblocked) in the processing computer system.

This provides the advantage that no programs or services listening to the network ports and therefore constituting a potential security gap (for buffer overflow or DoS attacks or so-called distributed DoS attacks, for example) are configured or available on the processing computer systems to unblock communication with an external computer system. Thus, the term "closed network ports" means that these ports are not "listening ports." This means that external connection establishment is not permitted here (without authorized unblocking according to the method). A third party (hacker) is not capable of logging-in or authenticating himself/herself on the processing computer system via network, in Unix-based systems via a secure shell daemon (SSH) Daemon, a http-daemon or other services/applications and the like or of performing specific actions on the processing computer system.

However, local access to the processing computer system can be configured for a predetermined user group (e.g., for security personnel). For other third parties, local access to the processing computer system is prevented, however.

By generally encapsulating the processing computer system as explained herein, an attack via network is made difficult because a decisive attacking option, i.e., running services or programs on opened (listening) network ports of the respective systems, are suppressed. Therefore, in the explained method, in particular security-critical data processed locally on the processing computer system is protected against attacks.

In contrast to the processing computer system, to unblock communication between the external computer system outside the computer network infrastructure and the processing computer system within the computer network infrastructure, the method allows access from outside the computer network infrastructure on the at least one broker computer system within the computer network infrastructure. The broker computer system can be accessed via network with at least one listening, open network port. This means that programs run or and/or applications (services) are prepared on the broker computer system so that a processing computer system within the computer network infrastructure or the external computer system outside the computer network infrastructure can each access the broker computer system and establish a connection to the broker computer system to store data packets in the broker computer system or fetch them from there (via a connection established at this point of time). In view of security aspects, such an "open" broker computer system is to be evaluated to be comparable to a traditional, specially-secured computer system.

Thus, the broker computer system serves as a (secured, but listening) broker for communication between the processing computer system and the external computer system.

Advantageously, connection establishment from the processing computer system to the broker computer system is effected via an internal network, which is secured as a virtual private network (VPN) or a secure shell network (SSH) or as a combination thereof. Alternatively or additionally, protocols specially developed to that end can also be used.

A connection establishment from the external computer system outside the computer network infrastructure to the broker computer system within the computer network infrastructure is effected via internet or a routing process from a separate intranet (from a client intranet), for example. The external computer system may be a client located downstream an NAT and/or a PAT router, for example. Connection establishment to the broker computer system is effected from a local client intranet via a private source IP-address of the client, the IP masked in the router with a public IP-address of the router.

An authentication of the external computer system has to be effected in the broker computer system to unblock the external computer system for communication with the initially secured processing computer system within the computer network infrastructure. Advantageously, the authentication packet contains signed information about the external computer system. This information may possibly include information about a service to be addressed or general processes on the processing computer system which is to be addressed by the external computer system.

Signing the information in the authentication packet provides the advantage that a manipulation of the authentication process is made complicated. This way, a significantly more secure authentication of external computer systems can be performed to unblock communication with processing computer systems within a secured computer network infrastructure compared to conventional port-knocking processes (see above).

The authentication packet transmitted to the broker computer system from the external computer system is supplemented in the further course of the method by the IP-addresses visible to the broker computer system (and therefore for the processing computer system). This IP-address can be the one of a NAT-router from which the broker computer system directly received the authentication packet. The authentication packet supplemented this way is transmitted from the broker computer system to the processing computer system.

Due to the fact that the processing computer system—as already described above—keeps its network ports closed and does not permit any external connection establishment, a process is initiated to transmit the authentication packet to the processing computer system, wherein the processing computer system per se addresses the broker computer system via network and establishes a connection to the broker computer system. In the further course, the authentication packet can be called-up in the broker computer system and transmitted from the broker computer system to the processing computer system via an established connection. The automated transmission is advantageously configured such that no impact option is permitted to third parties and, therefore, a risk of manipulation of the exchanged data or of one of the involved computer systems is made difficult or excluded.

After a successful authentication by the authentication packet, unblocking of at least one network port in the processing computer system is effected. In this context, "unblock" means a selective unblocking of the source IP-address filed in the authentication packet on a predetermined target network port of the processing computer system for a connection establishment and subsequent communication to and with the processing computer system (via one of the plurality of source network ports in combination with the source IP-address). After unblocking at least one selective network port by the processing computer system, the establishment of a connection (new session) to the selectively unblocked network port of the processing computer system by the external computer system is finally effected via the unblocked IP-address and a defined source network port.

It is advantageous to permit a respective connection establishment only within a predetermined time frame, which may possibly be short depending on the application (for example, several milliseconds or several seconds, up to 10 seconds, for example) depending on the network speed. If no corresponding connection establishment is effected within the predetermined time frame by the external computer system, the selectively unblocked network port of the processing computer system is closed again for security reasons to reduce the risk of a misused connection establishment or the manipulative exploitation of opened network ports (by a port scanning, for example) by computer systems with the (coincidentally) same IP-address, which are downstream the same NAT router.

One use of the method lies with unblocking the processing computer system for an external client requesting a targeted (although limited and secured within a certain frame) unblocking of the processing computer system within the computer network infrastructure.

The general advantage of the method is that an insecure and attackable opening of network ports on the processing computer system in reaction to a manipulatable request of an external computer system (via port-knocking, for example)

is prevented. Furthermore, the processing computer system cannot establish a connection to the outside of the computer network infrastructure to perform an authentication of an (initially) unknown source. Furthermore, the processing computer system is prevented from allowing an external connection without knowing whether the counterpart is even trustworthy. Prior to an authentication of an external computer system, merely secured communication is effected with the internal broker computer system within the computer network infrastructure on the side of the processing computer system for fetching an authentication file, which has been transmitted from the external computer system to the broker computer system. A targeted unblocking of a (source) IP-address for communication with the external computer system is effected not before successful authentication.

After establishment of a connection to the selectively unblocked target network port of the processing computer system, via which the subsequent communication with the external computer system is effected, the following additional step is advantageously performed:

restricting communication between the processing computer system and the external computer system to the unblocked target network port of the processing computer system and a network port of the external computer system which is known to the processing computer system to be the source network port by the established connection. In these measures, it is to be considered that connection establishments of multiple computer systems possibly taking place in parallel do not interfere with one another.

A restriction to the selective network port of the external computer system comes with the advantage that other communication is suppressed. This way, the external computer system may merely communicate with the processing computer system on individual network ports, i.e., on source network ports of the external computer system and target network ports to the processing computer system. The selective network port of the external computer system can be the source network port of the last transmission by the established connection, for example. If the external computer system is located downstream an NAT-router, non-authorized systems or attackers, also located downstream the NAT-router, are prevented from establishing an additional connection besides the already established connection between the external computer system and the processing computer system (by the same source IP-address and another source network port of the NAT-router) and obtain non-authorized access to the processing computer system. The above-mentioned measures allow restriction of access to an (individual) authorized network connection in a targeted manner. Further non-authorized connections are discarded or not considered in the processing computer system.

Advantageously, the following steps are performed by the external computer system after the establishment of a connection to the selectively unblocked network port of the processing computer system:

transmitting, by the external computer system, a verification packet directly to the processing computer system by the established connection, and confirming, by the verification information in the verification packet, the information of the authentication packet previously transmitted by the broker computer system.

By sending a verification packet, it can be ensured that the connection has been established with the correct authorized entity (and not by an unauthorized third party, e.g., with the same IP-address downstream an NAT-router or with a manipulated IP-address or with a stolen authentication packet). Thus, by the above-mentioned measures, it can be ensured that the external entity that previously indicated a respective connection via the authentication packet actually establishes the connection to the processing computer system after unblocking an IP-address stored in the authentication packet on a selective target network port of the processing computer system.

The above step of confirming the information of the authentication packet by verification information in the verification packet may include identity verification with the authentication packet. Thus, it can be ensured that no manipulations are made to the originally transmitted authentication packet.

Alternatively or additionally, confirming the information may include an obligatory storing of certain authorization or identification features in the verification packet, which are verified and confirmed in the processing computer system by stored comparison information. Authorization or identity features of this type, e.g., hardware features of the external computer system, may include biometrical features of certain users of the external computer system as well as passwords (passphrases or credentials, keys or the like).

Advantageously, the method comprises the additional step of:

verifying the authentication packet in the processing computer system, wherein unblocking the at least one selective network port by the processing computer system for the communication with the external computer system is effected only if the verification of the authentication packet was successful.

Advantageously, as an alternative and/or in addition to the verification of the authentication packet in the processing computer system, the method comprises the additional steps of:

verifying the authentication packet in the broker computer system, and discarding the authentication packet by the broker computer system if the verification way not successful.

A validity verification of the authentication packet in the processing computer system and/or in the broker computer system is a security measure, wherein predetermined information needs to be fulfilled in the authentication packet so that the authentication packet can be verified to be valid and an unblocking of the processing computer system is triggered.

Verification of the authentication packet in the broker computer system already, is an anticipating security measure prior to the transfer to the processing computer system. Discarding an invalid authentication packet may be logged by a monitoring, if required. Advantageously, the method is stopped after discarding the packet. Otherwise, the authentication packet is transmitted to the processing computer system as described above.

Advantageously, the authentication packet contains a signature of a (separate) key computer system and/or a signature of the external computer system. A separate key computer system is an additional security entity. A signature of the key computer system prevents manipulation of the authentication packet in the external computer system. Private keys (passphrases, credentials and the like) to generate the respective signature are merely locally stored in the key computer system or the external computer system, but advantageously not known on other computer systems involved in the method. As an additional security measure, the authentication packet can be encrypted with a public key of the external computer system (or the user thereof) and/or of the key computer system.

Security of the authentication process is increased within the described method by the signed information in the authentication packet, which has been signed via a signature of a separate key computer system. For example, a predetermined external computer system can be set to unblock communication with the initially secured processing computer system within the computer network infrastructure by a security responsible who has access to the key computer system. This information is locally signed by a private key of the security responsible and subsequently the authentication packet is generated therefrom.

Advantageously, further predetermined implementation parameters can be set in this (above-described) key computer system or a in another key computer system for access of the external computer system to the processing computer system. Such implementation parameters can be transmitted from the respective key computer system to the external computer system, wherein the authentication packet is generated in the external computer system based upon the set implementation parameters. For example, the authentication packet may directly contain the implementation parameters set by the key computer system. Such further implementation parameters represent an additional security measure that defines which external computer systems under which circumstances to what extent are to receive or are allowed to receive an unblocking on a processing computer system within the computer network infrastructure.

The latter implementation parameters may also be signed with at least one private key by the key computer system. Advantageously, all signatures and/or implementation parameters stored in the authentication packet are verified in the processing computer system and/or the broker computer system according to the above-described measures. This ensures that an unblocking of the external computer system on the processing computer system is authorized by the key computer system as a security entity.

All above-mentioned measures can of course be also applied to the verification packet, sent directly from the external computer system to the processing computer system for the confirmation of the authentication packet, as described above in the context of further method steps and measures.

Advantageously, the transmission of the authentication packet from the broker computer system to the processing computer system comprises the following steps:
  sending a predetermined data sequence from the broker computer system or from the external computer system to the processing computer system, wherein the predetermined network ports of the processing computer system are closed and wherein the sequence addresses one or multiple network ports of the processing computer system in a predetermined order,
  verifying the send data sequence for conformance with a predetermined sequence in the processing computer system, as well as
  causing the transmission of the authentication packet by the processing computer system, if the verification of the sent sequence is positive.

The measures come with the advantage that generally network ports (decisive for the method) of the processing computer system are initially closed (in the above described sense) and block external connection establishment to the processing computer system or significantly complicate manipulative access. The processing computer system has permanently (except for a short time period in which a certain source IP-address is unblocked according to the above steps) closed network ports and blocks any connection establishment for all external computer systems that are not able to authenticate themselves within the computer network infrastructure via corresponding authentication packets, as described above.

Causing transmission of the authentication packet by the processing computer system for the authentication of an external computer system to be unblocked may be an automated process for the transmission of the authentication packet to the processing computer system (e.g., via the UNIX-based command "Secure copy," scp). According to the process, the processing computer system per se establishes a connection to the broker computer system and fetches the authentication packet. This process can be triggered by the processing computer system, after a predetermined data sequence was sent to the processing computer system, if this data sequence matches a predetermined sequence. The sequence-sending computer system may be the broker computer system or, alternatively, the external computer system. The IP-address of the sequence-sending computer system can be predefined to be static in the processing computer system or be dynamically taken from the IP-addresses of potential sequence-sending computer systems known to the kernel of the processing computer system.

As described above already, such a method is known as "port-knocking." The above-mentioned steps may be performed by a so-called knock daemon, for example, i.e., a program that enables port-knocking. The knock daemon is informed by the processing computer system about data packets arriving at its network interface, verifies the data sequence sent to the processing computer system and possibly causes (e.g., by starting a script or program) a controlled transmission of the authentication packet from the broker computer system to the processing computer system, if the sent data sequence matches the predetermined sequence. The above-described course thus allows (activated by the processing computer system, which addresses a corresponding service on the broker computer system via network) transmitting/copying the authentication packet from the broker computer system to the processing computer system, without the processing computer system being required to keep an open network port with an addressable program to that end.

Alternatively, or in addition to the above described port-knocking, it is also possible that the processing computer system polls at the broker computer system at regular intervals (so-called polling) whether one or multiple authentication packets to be exchanged are present. If this is the case, a corresponding transmission of the authentication packets from the broker computer system to the processing computer system can be initiated, as described above. It is also possible that the processing computer system performs a polling when a certain time period, in which port-knocking is not performed on the side of the broker computer system or the external computer system, is exceeded, for example. This way, port-knocking problems can be detected and operability of the computer network infrastructure is maintained.

Alternatively to the mentioned solutions (port-knocking, polling), it is also possible to provide a specific connection net between the broker computer system and the processing computer system, wherein the processing computer system keeps at least one network port open for addressability via this specific connection network. Then, the authentication packet could be transmitted from the broker computer system to the processing computer system via the connection network. Advantageously, another protocol can be used than is provided for a connection between the external computer system and the broker computer system. Such a protocol change also increases security against manipulation from outside the network.

Advantageously, data packets are routed via packet filter between the external computer system and the computer network infrastructure, wherein the packet filter keeps at least one network port open toward the external computer system for access by the external computer system and wherein the packet filter keeps predetermined network ports closed toward the computer network infrastructure so that at least access to the external computer system from a processing computer system within the computer network infrastructure is prevented.

The packet filter provides the advantage that the computer network infrastructure remains secured toward the outside so that no initial queries regarding connection establishment, information and the like can be sent to the outside from an internal computer system (e.g., after an attack) because the packet filter would not forward the data. Corresponding packets are thus discarded from the direction of the computer network infrastructure in the packet filter. On the other hand, it is possible to transport authentication packets of external computer systems via the packet filter into the computer network infrastructure and to store them in the broker computer system. Thus, such a packet filter is a protection/blockage to the outside.

Advantageously, data packets are routed via (another) packet filter between the broker computer system and the processing computer system within the computer network infrastructure, wherein this packet filter forwards, in the communication direction from the broker computer system toward the processing computer system, only data packets that contain the IP-address of the broker computer system and that can be assigned to an already established connection between the broker computer system and the processing computer system.

This filtering advantageously permits only data packets of a connection having the "established" or "related" status from the exact IP-address of the broker computer system. An attempt to establish a connection (e.g., via sending so-called SYN packets) or even sending of port-knocking packets initially from the broker computer system is blocked by this packet filter.

The filtering prevents faking an IP-address (so-called IP spoofing) of an allegedly confidential (external or internal) computer system from the broker computer system (manipulated after attack). Thus, the establishment of a manipulated connection is prevented, which could avoid a port filter or a port block at the processing computer system and would thus receive manipulated access to selective opened network ports of the processing computer system. Such a packet filter is a protection or blockage against internal manipulation, as a result. If the broker computer system is manipulated by an attacker, these measures prevent the attack from expanding to the internal processing computer system within the computer network infrastructure via a manipulated "confidential" IP-address, which does not correspond to the exact IP-address of the broker computer system.

Even if an attacker intends to use in the broker computer system the exact IP-address thereof for a continued attack, initial attempts to establish a connection to the processing computer system remain unsuccessful because the data filter merely permits replies within connections that have been established originating from the processing computer system. In this way, the measures complicate access to possibly confidential data within the processing computer system due to an attack from the broker computer system.

In the communication direction from the processing computer system toward the broker computer system, a permitted data exchange can be unblocked to predetermined network ports of the broker computer system for selected services (e.g., scp, or, alternatively, other selected protocols) by the described packet filter.

Advantageously, the transmission of the authentication packet from the external computer system to the broker computer system comprises the following sub-steps:

establishing a connection from the external computer system to a broker load balancer, which is connected upstream a multitude of broker computer systems, selection of the broker computer system from a plurality of broker computer systems by the broker load balancer, and forwarding the authentication packet from the external computer system via the broker load balancer to the selected broker computer system.

Such a broker load balancer is advantageously used in a constellation in which a plurality of broker computer systems is configured to handle a plurality of requests by a plurality of external computer systems for unblocking according to the described ways and manners. In particular, in a large volume, the network load can be divided by the broker load balancer to different broker computer system so that a good performance of the computer network infrastructure is maintained. The individual broker computer systems each operate according to the above described method.

In particular, the broker load balancer routes data packets (e.g., generally all IP packets), that are sent from external computer systems, to a specific broker computer system selected in advance by the broker load balancer. The respectively selected broker computer system particularly takes up an authentication data packet of an external computer system forwarded via the broker load balancer.

For the selection of one from the plurality of broker computer system, the broker load balancer may use any algorithm. Such an algorithm may effect a discrimination in terms of the visible IP-address assignable to the external computer system in the simplest case. As described above already, this IP-address may be the address of an NAT router that the broker load balancer directly received the authentication packet from. The algorithm may include a so-called "source hashing scheduling," for example. Network connections to the downstream broker computer systems are assigned from a look up table depending on (public) source IP-addresses, which can be assigned to requesting external computer systems.

After selection of a specific broker computer and forwarding of the authentication packet to this broker computer system by the broker load balancer, the broker computer system subsequently performs a processing or forwarding of the authentication packet described according to the method to a corresponding processing computer system. A selection of one of a plurality of processing computer systems is possibly effected in the broker computer system.

After a successful authentication of an external computer system by the authentication packet, a connection to the selectively unblocked network port of the (selected) processing computer system is established by the external computer system (as described above). This may be effected, in an example, via the broker load balancer, which forwards the connection from the external computer system to the processing computer system then. Advantageously, in this case, both a selection of a specific broker computer system by the broker load balancer and possibly also a selection of a specific processing computer system by the corresponding broker computer system is effected by the same algorithm. This ensures that a connection request of an unblocked external computer system is forwarded from the broker load balancer to the correct processing computer system, which in turn received the authentication packet from the corresponding broker computer system.

In an example, the broker load balancer can be incorporated in a logically addressable system together with one or multiple of the above-mentioned packet filter. For example, a server may be configured, which provides both the functions of the broker load balancer and the functions of a corresponding packet filter.

Alternatively or additionally, the processing computer system operates as a processing load balancer, which is connected upstream a plurality of backend processing computer systems and performs the following measures:

selection of a back end processing computer system from the plurality of the backend processing computer systems, and forwarding a connection established to the selectively unblocked network port of the processing load balancer by the external computer system to the selected backend processing computer system.

In this example, load balancing is effected on the level of the processing computer systems, wherein the processing computer system according to the method operates as processing load balancer and multiple further processing computer systems as backend processing computer systems are connected downstream the processing load balancer for the further processing of a request and possibly unblocking of an external computer system. A selection of a specific backend processing computer system by the processing load balancer is advantageously effected by a predetermined algorithm. Similar to an above-described broker load balancer, a "source hashing scheduling" is feasible. Alternatively, other load balancing algorithms can be applied.

According to this example, an automatic transmission of an authentication packet from a broker computer system to the processing computer system is effected. As generally described above with respect to a processing computer system, the processing load balancer at least temporarily keeps predetermined network ports closed so that access to the processing load balancer via network by these network ports is prevented. However, the processing load balancer is capable of accessing the broker computer system to fetch the authentication packet from the broker computer system. After a successful authentication of the external computer system by the authentication packet, at least one selective network port in the load balancer is unblocked for communication with the external computer system. Subsequently, the external computer system is capable of establishing a connection to the selectively unblocked network port of the processing load balancer so that a further communication according to the method can be performed.

The processing load balancer forwards the connection established by the external computer system to a backend processing computer system, which had been selected by the processing load balancer in advance. Subsequently, for example, the application can be accessed then by the external computer system, the application being provided by the back end processing computer system.

In a further aspect, the above object is achieved by a distributed computer network. The distributed computer network comprises a computer network infrastructure which comprises at least a broker computer system and a processing computer system. Furthermore, at least one external computer system is configured in the distributed computer network, which is located outside the computer network infrastructure.

The external computer system is configured to transmit an authentication packet to the broker computer system for authentication for communication with the processing computer system. The broker computer system is configured to transmit the authentication packet to the processing computer system in an automated manner.

The processing computer system comprises an access control unit, which is configured to keep predetermined network ports at least temporarily closed so that access to the processing computer system via network by these network ports is prevented, but access of the processing computer system to the broker computer system is permitted to fetch the authentication packet from the broker computer system.

Furthermore, the access control unit of the processing computer system is configured to unblock at least one selective network port for communication with the external computer system after a successful authentication of the external computer system at the processing computer system or at one of the backend processing computer systems downstream the processing computer system.

Advantageously, such a distributed computer network is configured to perform a method of the type described herein.

The advantages mentioned in the context of the above described method result analogously also from the distributed computer network of this type. All advantageous measures described in the context of the above method are also applied in the corresponding structural features of the distributed computer network and vice versa.

The above advantages may be achieved by a computer program product configured to be executed on one or multiple computer systems and which, when executed, performs a method of the above-described type.

My methods, networks and computer products will be further explained with respect to the drawings.

FIG. 1 shows a schematic illustration of a part of a computer network infrastructure, comprising a broker computer system, which is declared to be the task server in FIG. 1, as well as a processing computer system, which is declared to be the target server in FIG. 1. The task server and the target server are capable of communicating with one another via a network N.

Furthermore, the computer network infrastructure of FIG. 1 comprises a packet filter connected inward to the task server as well as to the target server via the network N and connected outward via internet or via a further intranet to the outside world. The latter connection is schematically indicated as a cloud in FIG. 1.

In the illustrated topology, the task server is configured as a so-called "open" system. This means that the task server has at least one network port open for the purposes described in this context, wherein a service or an application runs on the task server to enable an addressability or connection establishment via network N. For example, a network connection in this computer system can be restricted via VPN ("virtual private network") or SSH ("secure shell") or a combination of such security measures so that only predetermined, encrypted network connections with dedicated computer systems are permitted via the network N. The task server serves as a broker for the communication and forwarding of data packets to the target server within the computer network infrastructure.

In contrast to the task server, the target server generally operates as a specifically secured system with closed network ports. This is schematically indicated by a hatch input/output level at the target server in the drawing. That means that initially no running programs or services are externally visible or available at the network ports for addressability or connection establishment via network N. Rather, a non-authorized access to the target server via network N is not possible due to the respectively closed network ports of the target server, because non authorized connections, e.g., by suitable firewall rules (e.g., ip tables) (either on the target server per se or on an upstream system (e.g., a router)) are suppressed. However, it is also possible that a user group can locally access the target server to locally perform predetermined actions there.

The packet filter comprises network ports toward the task server and toward the target server (i.e., in the direction of the network N), which are closed for the purposes stated in this context. This is illustrated in FIG. 1 by a cross-hatched input/output level at the packet filter in the direction of network N. That means that the packet filter, as described in conjunction with the target server above, does not forward any data to the outside, and thus does not permit any connection establishment to the outside from the task server or from the target server via network.

In turn, the packet filter comprises at least one open network port (so-called "listening" port) in the communication direction from outside the computer network infrastructure, i.e., via the symbolically illustrated internet or another intranet so that connection establishment to the task server of the computer network infrastructure from outside (internet, intranet) is possible by the packet filter via the network N. Thus, the packet filter of FIG. 1 is a protection of the computer network infrastructure to the outside. Furthermore, it prevents undesired traffic from the inside to the outside.

For the communication within the computer network infrastructure between the task server and the target server, a predetermined process is configured. Instructions can be directly transmitted to the task server from the target server via an established connection ("established"), because the task server, as described above, is directly addressable from the target server via the network N.

At first, in the direction toward the target server, starting from the task server or from an external computer system (not illustrated) outside the computer network infrastructure, a port-knocking needs to be performed. To that end, a predetermined data sequence of packet data is sent to the target computer system either from the task server or from the external computer system, wherein the network ports of the target server are closed and wherein the sequence addresses one or multiple network ports of the corresponding processing computer system in a predetermined order. Subsequently, the sent sequence is verified in the target server for conformance with a predetermined sequence. In the success case, for communication between the target server and the task server, a connection is established starting from the target server toward the task server as well as causing transmission of a corresponding data packet and/or instruction is effected via the established connection ("established").

In particular, the target server starts a process that fetches a data packet to be transmitted from the task server. Such a process may be effected via the Unix-based "Secure Copy" (scp) command, for example. This way, the involved computer systems are capable of communicating with one another within the computer network infrastructure despite closed network ports of the target server, forward data packets and/or place instructions.

Hereinafter, a method of unblocking communication between the secured target server within the computer network infrastructure and an external computer system outside the computer network infrastructure (not shown in FIG. 1) is to be explained by several method steps, indicated in the drawing by reference numerals 1 to 6.

In a step 1, an external computer system requests the unblocking of communication with the target server via the internet and/or an intranet separate from the computer network infrastructure (network N). For example, the external computer system may be a client intending to unblock an application on the target server within the computer network infrastructure. However, at this point of time, the target server does not have any open network ports for the external computer system and does not permit external connection establishment.

For example, the external computer system can be arranged downstream an NAT/PAT router, which masks a local private IP-address of the external computer system with a (unambiguous) public IP-address of the router. This way, however, the external computer system is not directly addressable by the target server, because the target server does not know the exact (private) IP-address of the external computer system. Furthermore, according to the configuration of FIG. 1, the target server is not capable of initiating any connection to outside the computer network infrastructure via the packet filter because the packet filter neither forwards any data nor permits connection establishment to the outside in the direction of the network N, as described above.

For an authentication of the external computer system for unblocking communication with the target server, which initially likewise comprises closed network ports and does not permit direct connection establishment from the external computer system, a special authentication method needs to be performed.

To that end, the external computer systems sends an authentication packet in step 1 via the internet/intranet (see cloud symbol in FIG. 1) and via the packet filter via network N to the externally addressable task server within the computer network infrastructure. For the transmission of this packet, authentication of the external computer system at the task server may be required (e.g., via a VPN and/or the like).

The authentication packet contains signed information for the authentication of the external computer system at the target server. This signed information may contain signatures of the external computer system and/or of a separate key computer system (not illustrated), wherein the key computer system is a security entity for setting and signing the external computer system to be a permitted computer system for access to the target server. A separate key computer system as a separate security entity has the advantage that an authentication can not or only hardly be faked only in the external computer system. This way, it is ensured that an external computer system intended to at least partially unblock the target server for communication, is actually authorized.

Furthermore, the signed information in the authentication packet may also contain information about the external computer system (e.g., the service that the external computer systems intends to address) and/or possibly implementation parameters for the predetermined performance of an unblocking or of a process in the target server to be performed after the unblocking. The authentication packet may also contain data generated from passwords (of users) such as hash values or signatures. A further or final authentication is optionally possible at the target server.

In a step 2, the external computer system sends a knock signal in the sense of port-knocking (as described above) directly to the target server via the internet/intranet and the packet filter of the computer network infrastructure by the network N. A predetermined data sequence of the knock signal is evaluated at the initially closed network ports of the target server via a service (e.g., a knock daemon) and compared to a predetermined data sequence. If the sequences match, a script or a program is started in the target server, for example, for the further processing of the authentication packet present in the task server.

The measures of step 2 (knocking at the target server) somehow represent an initialization for the target server as to that a data packet is present in the task server for further actions. A port-knocking at the target server may also be effected, as an alternative to the external computer system, from the task server in the direction of the target server.

The authentication packet present in the task server is initially locally processed in a step 3. This processing may include a signature verification and/or a verification of further information in the authentication packet, e.g., of implementation parameters. Furthermore, in this step, the authentication packet is supplemented by the visible source IP-address, which can be assigned to the external requesting computer system and which is the public IP-address of a NAT router, which sent the authentication packet to the task server, for example. This way, in the course of the method, the target server knows that this supplemented source IP-address is to be temporarily unblocked.

Furthermore, in step 3, the authentication packet is moved into a buffer storage to be fetched by the target server, if the verification of the authentication packet in the task server was successful. Otherwise (if a verification was not successful), the authentication packet can be discarded in the task server, for example. Then, no further action is effected and the method ends.

Furthermore, upon successful verification and storage of the authentication packet in the task server for being fetched by the target server, a routing of the authentication packet to the target server may be determined. For example, this makes sense in computer network infrastructures having multiple target servers so that it can be ensured that an authentication packet is distributed to the correct target computer system within the computer network infrastructure.

In step 4, the target server causes a connection establishment to the task server via network N and starts a process for the transmission of the authentication packet from the task server to the target server via the established connection. Such a process can be effected via the Unix based scp-command, for example.

Subsequently, the authentication packet is transmitted from the task server to the target server via network N of the computer network infrastructure.

Advantageously, the authentication packet is verified in the target server once again. To do so, verification steps as performed in step 3 in the task server can be performed here. Additional verification steps, e.g., a verification of a process in the target server, which is to be instructed by the authentication packet, and so on, are possible.

If a verification of the authentication packet is successful here as well, the source IP-address known to the target server by the supplemented authentication packet to be the external source IP-address (which can be assigned to the requesting computer system) (see above) is unblocked. Unblocking can be effected selectively at one or multiple individual target network ports of the target server. Thus, the target server is addressable for a connection establishment based upon the source IP-address (and exclusively from this address) at one or multiple predetermined target network ports.

In a subsequent step 5, which is to be advantageously effected in a fixedly predetermined (short) time period after unblocking the selective target network port at the target server, now the external computer system, which is capable of accessing the computer network infrastructure from the internet/intranet via the packet filter via network N, establishes a new connection (new session with the combination "external known source IP-address/selected source network port") to the/a opened target network port of the target server. If, for example, within a predetermined time period such a connection establishment is not effected by the external computer system, all target network ports selectively opened according to the method are closed again for the concerned IP-address at the target server (provided no other external computer system are requesting within the same time frame) so that the target server is no longer addressable for all external computer systems having the same source IP-address (initial state). External computer systems having another IP-address are not capable of establishing any connection to the target server during the entire course of the method regardless thereof.

Or else (along with a timely connection establishment of a new session) a renewed transmission of a verification packet directly to the now selectively opened target server is effected via the thus established and maintained connection between the external computer system (by the known source IP-address) and the target computer system. The verification packet may contain the same information of the authentication packet, which has previously reached the target server by the task server. Alternatively, or in addition, the verification packet may also contain further verification features (e.g., identification features of the external computer system or the users thereof, biometrical data, passwords, passphrases, keys and the like)

A verification as to whether the verification packet matches the previously sent authentication packet or a verification and confirmation of the information of the authentication packet is effected then in the target server by further verification features, depending on the configuration of the verification packet. This verification is a security measure as to that the established connection has actually been initialized from the external computer system (and exclusively from this system) that previously requested unblocking of the target server. In particular, this verification is a security measure against attackers, who did not send the authentication packet, but are located downstream an NAT router with the source IP-address unblocked in the target server and intend exploiting the unblocking for manipulated access to the target server as an attack. Such attackers could then present no verification packet or a faked verification packet so that the target server detects that a non-authorized connection has been established. Such a security measure thus complicates manipulation of the method by the attacker from outside.

When the match or confirmation of the authentication packet has been successfully verified by the verification packet, the established connection is restricted exclusively to the combination of the unblocked source IP-address in conjunction with the source network port, from which the verification packet was sent the last time. In this way, the target server restricts the established connection not only to the IP-address, but also to the actual source connection via the used source network port of the authorized external computer system. Further connections via the same source IP-address, but different source network ports, to the target server will be suppressed, as a result. In this way, potential attack scenarios are significantly complicated or suppressed. In these measures, it is to be considered that potentially parallel-occurring connection establishments of multiple computer systems do not interfere with one another.

Thus, after this procedure, merely one selectively established connection is present between the source network port of the external computer system (potentially via masked source network port of an NAT router) and a selectively unblocked target network port at the target server. In a subsequent step 6, an application-specific further communication can then be effected between the external computer system and the target server within the computer network infrastructure by this restricted connection.

This way, the external computer system caused the unblocking of the target server for communication via authentication. Nevertheless, the method is significantly more secure against external attacks than conventional methods.

Figure 2:
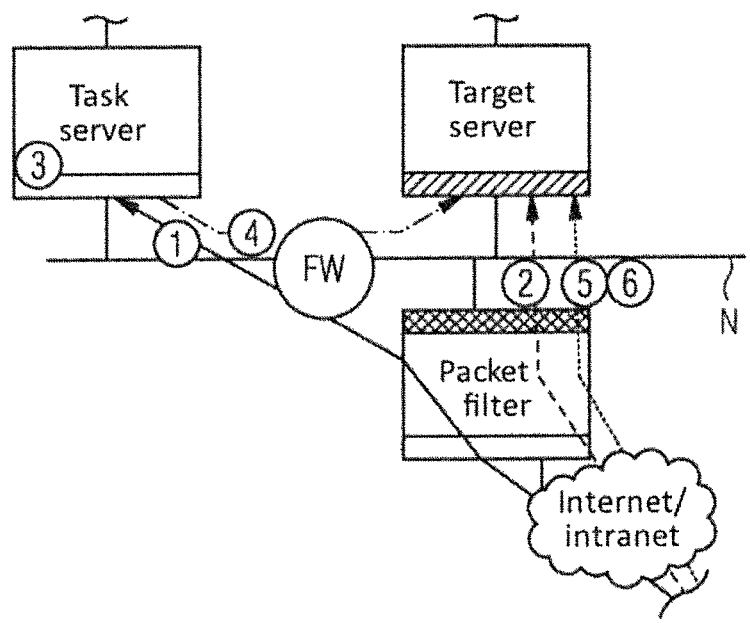
FIG. 2 is a schematic illustration of at least a part of a computer network infrastructure according to a second configuration to unblock an external computer system.

FIG. 2 shows the configuration of the computer network infrastructure according to FIG. 1, however with a further packet filter FW, which is configured in the network N between the task server and the target server as a security measure against attacks within the computer network infrastructure. All other entities, measures and methods steps are identical to the procedure according to FIG. 1, which is why a repeated explanation may be omitted at this point.

The packet filter FW essentially serves for defending an attack to the target server originating from the task server. An intruder, which obtained certain rights (e.g., administrator rights) in the task server, could perform an attack by ID spoofing, for example, to pretend to be an external client with an authorized external IP-address. This way, an optional port filter could be avoided at the target server (which does not permit any connection establishment from other computer systems). In this way, originating from the task server, authorized access to the target server could be faked via a faked IP-address.

As a counter measure, the packet filter FW is configured, which, in the communication direction from the task server to the target server, merely permits data packets of an already established or related connection that originate from the exact IP-address of the task server. Other packet data are discarded or ignored and not forwarded at the packet filter FW in this communication direction. Thus, merely data packets which reliably and trustworthily originate from the task server arrive at the target server. A fake of an IP-address, originating from the task server (IP spoofing), is significantly complicated or suppressed as a result.

In the reverse communication direction, from the target server to the task server, the packet filter FW may advantageously only allow data packets addressing a specific service at the task server (e.g., scp or ssh or a combination thereof). This way, the task server is completely cut-off in the direction of the target server so that no attack, that originates from the task server, to the target server is successful. However, as described according to FIG. 1, in the reverse direction, the target server can fetch an authentication packet from the task server via the scp-service, for example.

The packet filter FW according to FIG. 2 can be realized as a specifically secured 1:1 NAT router (IP-address translation), for example. It is also possible to provide specific verification mechanisms in this router, even in terms of the authentication packet. In 1:1 NAT routing, IP-addresses of arriving packets are statically translated into other IP-addresses. For example, an arriving packet having the exemplary address of 10.10.10.10 could be translated into the address of 11.11.11.11.

Figure 3:
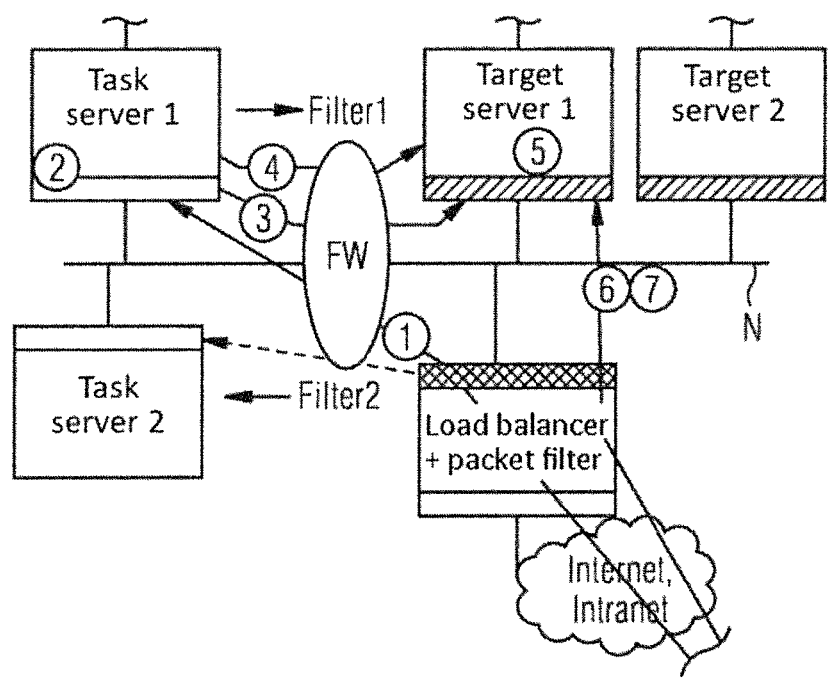
FIG. 3 is a schematic illustration of at least a part of a computer network infrastructure according to a third configuration with load balancing to unblock an external computer system.

FIG. 3 shows a third configuration of a computer network infrastructure, which is generally configured as the computer network infrastructure according to FIG. 2 and operates accordingly. However, the computer network infrastructure according to FIG. 3 comprises two broker computer systems, namely task server 1 and task server 2 as well as two processing computer systems, namely target server 1 and target server 2. In addition, see also FIG. 1, a load balancer is integrated in the packet filter, the load balancer operating as a broker load balancer according to FIG. 3. The functioning of the computer network infrastructure according to FIG. 3 will be explained hereinafter.

In a step 1, an external computer system, which can be configured as an external client analogously to the descriptions regarding FIGS. 1 and 2, established a connection to the load balancer via the packet filter via the internet and/or an intranet separate from the computer network infrastructure (network N). The two processing computer systems, target server 1 and target server 2, do not have open network ports for the external computer system via network N and thus do not allow external connection establishment. Toward task servers 1 and 2, target server 1 and target server 2 are additionally secured via the further packet filter FW, as described in the context of FIG. 2.

The load balancer guides the data packets (generally IP packets) of the external computer system to one of the broker computer systems, task server 1 and task server 2, by an arbitrary load balancing algorithm. For the selection of task server 1 or task server 2, the load balancer can use an algorithm according to the so-called "source hashing scheduling," for example. In this case, the load balancer selects a corresponding task server from the group of task server 1 and task server 2, here task server 1, depending on the public IP-address that can be assigned to the external computer system.

In this way, according to the method, the above-described authentication packet is transmitted from the external computer system to the task server 1 by the load balancer in step 1, and processed further there in a step 2 as described in conjunction with FIG. 1. For example, this includes validity verification and supplementation with the IP-address that can be assigned to the external computer system.

Generally, in this configuration, even task server 1 and task server 2 can select between target server 1 and target server 2 by a predetermined algorithm. Advantageously, in this case, the algorithm for selecting one of the target servers 1 and target server 2 is the same algorithm as the one in the load balancer for the selection of one of the task server 1 and task server 2 depending on the IP-address that can be assigned to the external computer system. As a result, it is ensured that an assignment of an external computer system for the unblocking of a connection establishment to a respective target server is identically effected both in the load balancer and in task servers 1 and 2. This has the effect that a connection establishment from an unblocked external computer system by the load balancer is also effected to the target server from target server 1 and target server 2, to which the corresponding authentication packet of the external computer system has been transmitted for unblocking this system.

By way of example, in a step 3, task server 1 performs a port knocking at the previously selected target server 1 to indicate to the target server 1 that an authentication packet is ready for collection in the task server 1. Subsequently, in step 4, target server 1 is capable of establishing a connection to task server 1 and to fetch the authentication packet, as described according to the method in the context of FIGS. 1 and 2.

In a step 5, the target server 1 verifies the authorization of the external computer system by the authentication packet for the further connection establishment, analogously to the above-described method. In the success case, one network port in the target server 1 is unblocked for the IP-address, which can be assigned to the external computer system, for access by the external computer system.

Finally, in a further step 6, possibly upon lapse of a controlled (short) waiting time, a connection establishment of a new session from the external computer system to the load balancer is effected, which forwards it to the target server 1 (using the same algorithm as task server 1). This connection attempt may be repeated multiple times, if the attempt is not successful. This new session may be directly the desired connection to an application in the target server 1, for example, a VPN connection, in which the further communication is effected in a secured manner according to a step 7.

For the rest, reference is made to the explanations of FIGS. 1 and 2 in terms of the further functionality of the computer network infrastructure according to FIG. 3.

Figure 4:
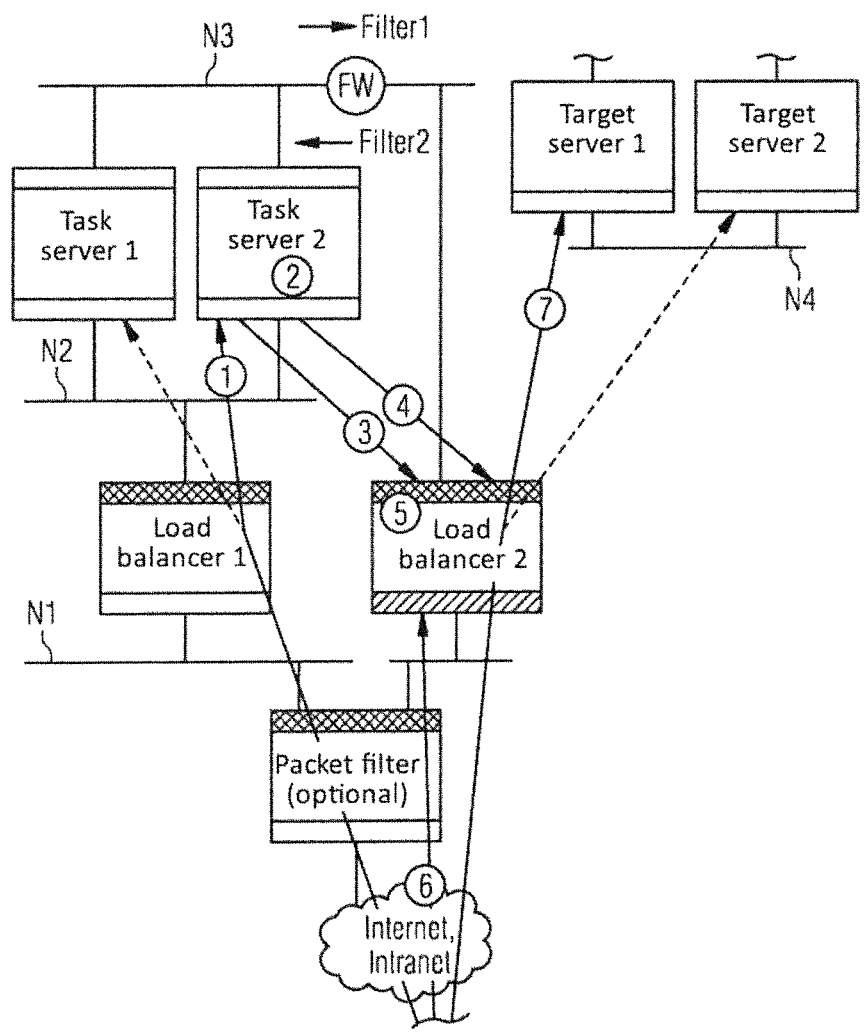
FIG. 4 is a schematic illustration of at least a part of a computer network infrastructure according to a fourth configuration with load balancing to unblock an external computer system.

FIG. 4 shows a further configuration of a computer network infrastructure further developing the structure of FIG. 3. In the computer network infrastructure according to FIG. 4, multiple broker computer systems, task server 1 and task server 2, are configured, with a load balancer 1 connected upstream. Load balancer 1 operates analogously to the load balancer according to FIG. 3 as a so-called broker load balancer for the selection of one from task servers 1 and 2 for the uptake of data packets from an external computer system.

According to FIG. 4, the group of the processing computer systems comprises a load balancer 2, which operates as a so-called processing load balancer, as well as a target server 1 and a target server 2 in analogy to FIG. 3, which are both connected downstream the load balancer 2 in the communication as so-called backend processing computer systems. Hereinafter, the functionality of the computer network infrastructure will be explained according to FIG. 4.

In a step 1, an external computer system establishes a connection to the load balancer 1 via the optional packet filter by network N1 via the internet and/or an intranet separate from the computer network infrastructure. However, at this point of time, load balancer 2 does not have any open network ports and does not permit external connection establishment.

In analogy to the above described procedure, the load balancer 1 selects, in this example, task server 2 and hands-over the authentication packet of the external computer system by network N2. In a step 2, the authentication packet is further processed in task server 2, for example, verified in terms of validity and supplemented by the IP-address that can be assigned to the external computer system.

By way of example, in a step 3, task server 2 performs a port-knocking at load balancer 2 via network N3 to indicate to the load balancer 2 that an authentication packet is ready for collection in task server 2. Subsequently, in step 4, load balancer 2 is capable of establishing a connection to the task server 2 via network N3 and fetches the authentication packet, as described according to the method in conjunction with FIGS. 1 and 2.

In a step 5, load balancer 2 verifies the authorization of the external computer system by the authentication packet for the further connection establishment, analogously to the above described method. In the success case, a network port on the load balancer is unblocked for the IP-address, which can be assigned to the external computer system, for access by the external computer system.

Finally, in a further step 6, possibly after a controlled (short) waiting time, a connection establishment of a new session is effected from the external computer system to the load balancer 2, which is now unblocked for the external computer system. This connection attempt may be repeated several times, if it is not successful for the first time. Load balancer 2 can select between target server 1 and target server 2 via an arbitrary algorithm for the forwarding of a connection from the external computer system, wherein the target server 1 and target server 2 are addressable toward the load balancer 2 via opened network ports at network N4. In the example according to FIG. 4, the load balancer 2 forwards the connection of the external computer system to target server 1 via network N4 in step 7. This new session may be directly the desired connection to an application in the target server 1, for example, a VPN connection, in which further communication is effected in a secure manner according to a step 7.

It is to be noted that load balancer 1 and load balancer 2 may possibly be integrated in one physical device. Moreover, one or both load balancer 1 and/or 2 can also have a redundant design. In this case, the current configuration should be mirrored on the redundant load balancer accordingly, for example, via a storage area network.

For the rest, reference is made to the explanations on FIGS. 1 to 3 with respect to the further functionality of the computer network infrastructure according to FIG. 4.

Figure 5:
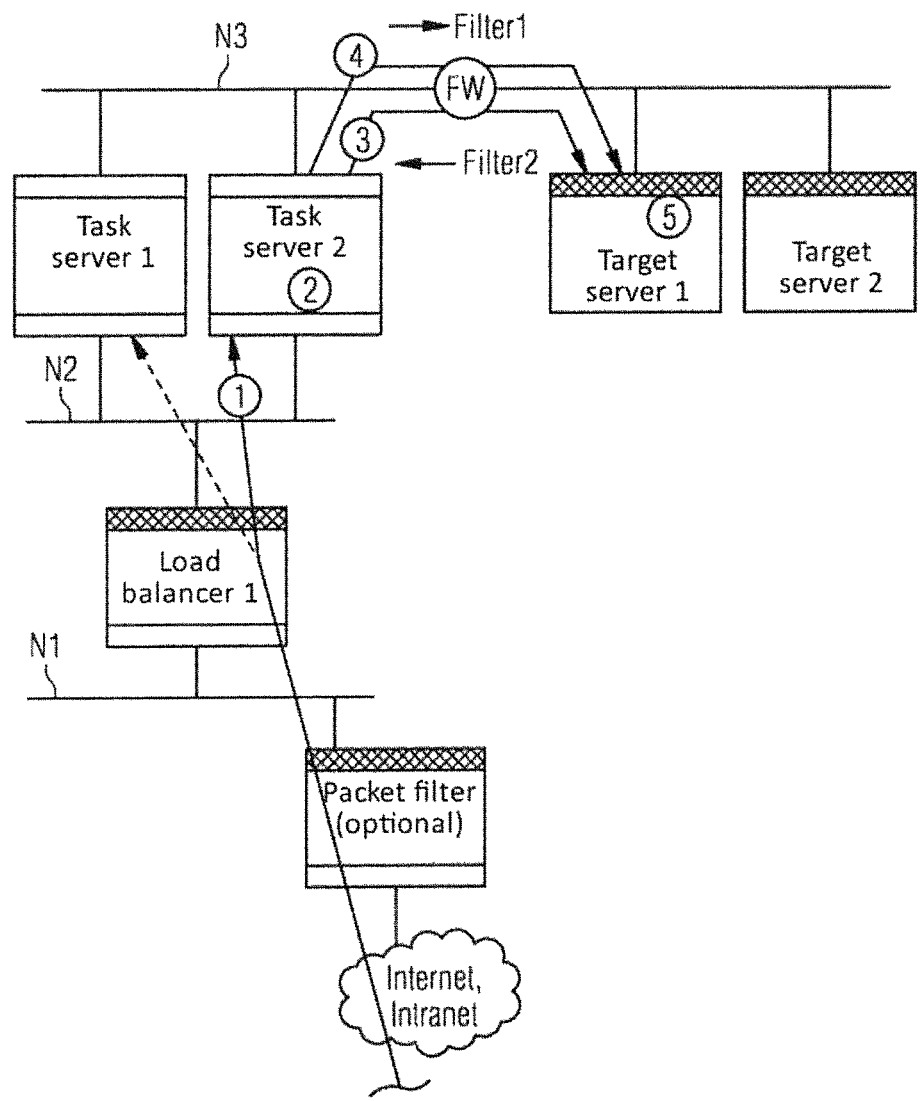
FIG. 5 is a schematic illustration of at least a part of a computer network infrastructure according to another configuration with load balancing for general communication with an external computer system.

FIG. 5 shows a configuration of a computer network infrastructure with a functionality similar to the descriptions on FIGS. 3 and 4. In contrast to the constellation in FIG. 4, the computer network infrastructure according to FIG. 5 comprises merely one load balancer 1 as well as an optional packet filter. For the rest, in the computer network structure according to FIG. 5, again two task servers 1 and 2 as well as two target servers 1 and 2 are provided. The constellation according to FIG. 5 essentially server for the access to one of the target servers 1 or 2 by a load balancer by an external computer system without establishing a permanent session. In this way, for example, data packets can be forwarded from an external computer system to one of the target servers 1 or 2 for the further processing within the secured computer network infrastructure. A high network load can be handled by the load balancer 1 so that the performance of the computer network infrastructure is maintained.

According to FIG. 5, an external computer system establishes a connection to the load balancer 1 via the internet and/or an intranet separate from the computer network infrastructure via the optional packet filter by network N1.

In analogy to the above described procedure, load balancer 1 selects, in this example, task server 2 and hands over one or multiple data packets of the external computer system by network N2. In a step 2, the data packets are further processed in the task server 2, for example, checked for validity thereof.

By way of example, in step 3, task server 2 performs port-knocking at the previously selected target server 1 via network N3 to indicate to the target server 1 that data packets are ready for collection in the task server 2. In this case, task server 1 keeps all network ports decisive for the method closed for addressability toward network N3. However, target server 1 may establish a connection to the task server 2 per se via network N3 in step 4 and fetch the data packets, as described above according to the method. A further processing of the data packets can be effected subsequently in a final step 5 in the target server 1. In this way, a simple data transfer from an external computer system to a target server via a load balancer is possible. A VPN connection between an external computer system and one of the target servers is not established in this example.

The methods presented herein provide the advantage that unblocking external computer systems for communication with a secured processing computer system or a secured processing load balancer for load distribution to a plurality of backend processing computer systems within a computer network infrastructure is possible in secure ways and manners, without opening the processing computer system or the processing load balancer (also) for external or internal attackers.

The invention claimed is:

1. A method of unblocking external computer systems for communication with secured processing computer systems in a computer network infrastructure, comprising:
   transmitting an authentication packet from an external computer system, which is configured outside the computer network infrastructure, to a broker computer system within the computer network infrastructure, wherein the authentication packet contains signed information for authentication of the external computer system,
   at least one processing computer system within the computer network infrastructure keeping predetermined network ports initially closed so that any access from the broker computer system or from the external computer system to the processing computer system via network by the network ports is prevented,
   sending a predetermined data sequence from the broker computer system or from the external computer system to the processing computer system, wherein the processing computer system keeps the predetermined network ports closed,
   addressing by the data sequence one or multiple closed network ports of the processing computer system in a predetermined order,
   verifying the sent data sequence for conformance with a predetermined sequence in the processing computer system,
   establishing by the processing computer system a connection starting from the processing computer system to the broker computer system,
   causing by the processing computer system a transmission of the authentication packet if the verification of the sent data sequence is positive,
   automatically transmitting the authentication packet from the broker computer system to the processing computer system, wherein the processing computer system accesses the broker computer system via the established connection between the processing computer system and the broker computer system and fetches the authentication packet from the broker computer system,
   verifying the authentication packet in the processing computer system,
   unblocking at least one selective network port by the processing computer system for communication with the external computer system, if verification of the authentication packet was successful, and
   establishing a connection to the selectively unblocked network port of the processing computer system by the external computer system.

2. The method according to claim 1, further comprising, after establishing a connection to the selectively unblocked network port of the processing computer system:
   limiting communication between the processing computer system and the external computer system to the unblocked network port of the processing computer system and a network port of the external computer system, which is known to the processing computer system by the established connection.

3. The method according to claim 1, further comprising, after establishing a connection to the selective unblocked network port of the processing computer system by the external computer system:
   transmitting a verification packet by the external computer system directly to the processing computer system by the established connection, and
   confirming the information of the authentication packet previously transmitted by the broker computer system by verification information in the verification packet.

4. The method according to claim 1, further comprising:
   verifying the authentication packet in the broker computer system, and
   discarding the authentication packet by the broker computer system if the verification was not successful.

5. The method according to claim 1, wherein data packets are routed via a packet filter between the external computer system and the computer network infrastructure,
   wherein the packet filter keeps at least one network port open toward the external computer system for access by the external computer system and wherein the packet filter keeps predetermined network ports closed toward the computer network infrastructure so that at least access from a processing computer system within the computer network infrastructure to the external computer system is prevented.

6. The method according to claim 1, wherein data packets are routed via a packet filter between the broker computer system and the processing computer system within the computer network infrastructure,
   the packet filter, in the communication direction from the broker computer system toward the processing computer system, only forwards data packets which contain the IP-address of the broker computer system and which can be assigned to an already established connection between the broker computer system and the processing computer system.

7. The method according to claim 1, wherein the transmission of the authentication packet from the external computer system to the broker computer system comprises:
   establishing a connection from the external computer system to a broker load balancer, which is connected upstream a plurality of broker computer system,
   selecting the broker computer system from the plurality of broker computer system by the broker load balancer, and
   forwarding the authentication packet from the external computer system to the selected broker computer system via the broker load balancer.

8. The method according to claim 1, wherein the processing computer system operates as processing load balancer, which is connected upstream a plurality of backend processing computer systems and performs:

selecting a backend processing computer system from the plurality of backend processing computer systems, and forwarding a connection, established by the external computer system to the selectively unblocked network port of the processing load balancer, to the selected backend processing computer system.

9. A distributed computer network comprising:

a computer network infrastructure comprising at least a broker computer system and a processing computer system, and at least one external computer system located outside the computer network infrastructure, wherein the external computer system is configured to transmit an authentication packet to the broker computer system for authentication for communication with the processing computer system, the processing computer system is configured to keep predetermined network ports initially closed so that any access from the broker computer system or from the external computer system to the processing computer system via a network by these network ports is prevented, the processing computer system is further configured to verify a predetermined data sequence sent to the processing computer system for conformance with a predetermined sequence in the processing computer system, the sent data sequence being sent from the broker computer system or from the external computer system to the processing computer system and addressing one or multiple closed network ports of the processing computer system in a predetermined order, the processing computer system is further configured to establish a connection starting from the processing computer system to the broker computer system, to cause a transmission of the authentication packet if the verification of the sent data sequence is positive, and to access the broker computer system via the established connection between the processing computer system and the broker computer system to fetch and automatically transmit the authentication packet from the broker computer system, and the processing computer system is further configured to unblock at least one selective network port for communication with the external computer system after a successful authentication of the external computer system at the processing computer system or at a backend processing computer system connected downstream the processing computer system.

10. The distributed computer network according to claim 9, wherein the computer network infrastructure comprises a plurality of broker computer systems and a broker load balancer connected upstream of the plurality of broker computer systems.

11. The distributed computer network according to claim 9, wherein the processing computer system is configured as a processing load balancer and the computer network infrastructure further comprises a plurality of backend processing computer systems having the processing load balancer connected upstream.

12. The distributed computer network according to claim 9, configured to perform a method comprising a method of unblocking external computer systems for communication with secured processing computer systems in a computer network infrastructure, comprising:

transmitting an authentication packet from an external computer system, which is configured outside the computer network infrastructure, to a broker computer system within the computer network infrastructure, wherein the authentication packet contains signed information for authentication of the external computer system, at least one processing computer system within the computer network infrastructure keeping predetermined network ports initially closed so that any access from the broker computer system or from the external computer system to the processing computer system via network by the network ports is prevented, sending a predetermined data sequence from the broker computer system or from the external computer system to the processing computer system, wherein the processing computer system keeps the predetermined network ports closed, addressing by the data sequence one or multiple closed network ports of the processing computer system in a predetermined order, verifying the sent data sequence for conformance with a predetermined sequence in the processing computer system, establishing by the processing computer system a connection starting from the processing computer system to the broker computer system, causing by the processing computer system a transmission of the authentication packet if the verification of the sent data sequence is positive, automatically transmitting the authentication packet from the broker computer system to the processing computer system, wherein the processing computer system accesses the broker computer system via the established connection between the processing computer system and the broker computer system and fetches the authentication packet from the broker computer system, verifying the authentication packet in the processing computer system, unblocking at least one selective network port by the processing computer system for communication with the external computer system, if verification of the authentication packet was successful, and establishing a connection to the selectively unblocked network port of the processing computer system by the external computer system.

13. A non-transitory computer program product configured to be executed within respective processors on multiple computer systems of a distributed computer network comprising a computer network infrastructure including at least a broker computer system and a processing computer system, and at least one external computer system located outside the computer network infrastructure, and which, when executed within the respective processors, performs a method of unblocking external computer systems for communication with secured processing computer systems in a computer network infrastructure, comprising:

transmitting an authentication packet from an external computer system, which is configured outside the computer network infrastructure, to a broker computer system within the computer network infrastructure, wherein the authentication packet contains signed information for authentication of the external computer system, at least one processing computer system within the computer network infrastructure keeping predetermined network ports initially closed so that any access from the broker computer system or from the external computer system to the processing computer system via network by the network ports is prevented, sending a predetermined data sequence from the broker computer system or from the external computer system to the processing computer system, wherein the processing computer system keeps the predetermined network ports closed, addressing by the data sequence one or multiple closed network ports of the processing computer system in a predetermined order, verifying the sent data sequence for conformance with a predetermined sequence in the processing computer system, establishing by the processing computer system a connection starting from the processing computer system to the broker computer system, causing by the processing computer system a transmission of the authentication packet if the verification of the sent data sequence is positive, automatically transmitting the authentication packet from the broker computer system to the processing computer system, wherein the processing computer system accesses the broker computer system via the established connection between the processing computer system and the broker computer system and fetches the authentication packet from the broker computer system, verifying the authentication packet in the processing computer system, unblocking at least one selective network port by the processing computer system for communication with the external computer system, if verification of the authentication packet was successful, and establishing a connection to the selectively unblocked network port of the processing computer system by the external computer system.

14. The distributed computer network according to claim 10, wherein the processing computer system is configured as a processing load balancer and the computer network infrastructure further comprises a plurality of backend processing computer systems having the processing load balancer connected upstream.

15. The distributed computer network according to claim 10, configured to perform a method comprising a method of unblocking external computer systems for communication with secured processing computer systems in a computer network infrastructure, comprising:

transmitting an authentication packet from an external computer system, which is configured outside the computer network infrastructure, to a broker computer system within the computer network infrastructure, wherein the authentication packet contains signed information for authentication of the external computer system, at least one processing computer system within the computer network infrastructure keeping predetermined network ports initially closed so that any access from the broker computer system or from the external computer system to the processing computer system via network by the network ports is prevented, sending a predetermined data sequence from the broker computer system or from the external computer system to the processing computer system, wherein the processing computer system keeps the predetermined network ports closed, addressing by the data sequence one or multiple closed network ports of the processing computer system in a predetermined order, verifying the sent data sequence for conformance with a predetermined sequence in the processing computer system, establishing by the processing computer system a connection starting from the processing computer system to the broker computer system, causing by the processing computer system a transmission of the authentication packet if the verification of the sent data sequence is positive, automatically transmitting the authentication packet from the broker computer system to the processing computer system, wherein the processing computer system accesses the broker computer system via the established connection between the processing computer system and the broker computer system and fetches the authentication packet from the broker computer system, verifying the authentication packet in the processing computer system, unblocking at least one selective network port by the processing computer system for communication with the external computer system if verification of the authentication packet was successful, and establishing a connection to the selectively unblocked network port of the processing computer system by the external computer system.

16. The distributed computer network according to claim 11, configured to perform a method comprising a method of unblocking external computer systems for communication with secured processing computer systems in a computer network infrastructure, comprising:

transmitting an authentication packet from an external computer system, which is configured outside the computer network infrastructure, to a broker computer system within the computer network infrastructure, wherein the authentication packet contains signed information for authentication of the external computer system, at least one processing computer system within the computer network infrastructure keeping predetermined network ports initially closed so that any access from the broker computer system or from the external computer system to the processing computer system via network by the network ports is prevented, sending a predetermined data sequence from the broker computer system or from the external computer system to the processing computer system, wherein the processing computer system keeps the predetermined network ports closed, addressing by the data sequence one or multiple closed network ports of the processing computer system in a predetermined order, verifying the sent data sequence for conformance with a predetermined sequence in the processing computer system, establishing by the processing computer system a connection starting from the processing computer system to the broker computer system, causing by the processing computer system a transmission of the authentication packet if the verification of the sent data sequence is positive, automatically transmitting the authentication packet from the broker computer system to the processing computer system, wherein the processing computer system accesses the broker computer system via the established connection between the processing computer system and the broker computer system and fetches the authentication packet from the broker computer system, verifying the authentication packet in the processing computer system, unblocking at least one selective network port by the processing computer system for communication with the external computer system, if verification of the authentication packet was successful, and establishing a connection to the selectively unblocked network port of the processing computer system by the external computer system.

\* \* \* \* \*